United States Patent [19]

Smith

[11] Patent Number: 5,751,283
[45] Date of Patent: May 12, 1998

[54] RESIZING A WINDOW AND AN OBJECT ON A DISPLAY SCREEN

[75] Inventor: Matthew W. Smith, Tulsa, Okla.

[73] Assignee: Microsoft Corporation, Redmond, Wash.

[21] Appl. No.: 651,114

[22] Filed: Jul. 17, 1996

[51] Int. Cl.$^6$ ........................................... G06F 3/00
[52] U.S. Cl. ...................... 345/342; 345/439; 345/438
[58] Field of Search ................................ 345/326–358, 345/439, 438, 302

[56] References Cited

U.S. PATENT DOCUMENTS

| | | | |
|---|---|---|---|
| 5,001,697 | 3/1991 | Torres | 395/342 X |
| 5,434,964 | 7/1995 | Moss et al. | 395/342 |
| 5,437,008 | 7/1995 | Gay et al. | 395/138 X |
| 5,487,143 | 1/1996 | Southgate | 395/342 |
| 5,544,288 | 8/1996 | Morgan et al. | 395/342 |

OTHER PUBLICATIONS

Foley et al., "Computer Graphics: Principles and Practice", 2nd ed., Addison–Wesley Pub. Co., pp. 438–447, Nov. 1993.

*Primary Examiner*—John E. Breene
*Attorney, Agent, or Firm*—Ronald M. Anderson

[57] ABSTRACT

Position and sizing of objects within a window that is resized is determined by selectively set parameters. Resizing of the object in response to resizing of a window in which the object appears can be set to an absolute or proportional basis or constrained to respond to only a vertical or a horizontal change in window size. Alternatively, an object can be centered within a window with reference to the margins of a window, which can be selectively set to change in an absolute or proportional manner as the window is resized. Movement of the object within the window can also be set in both the horizontal and vertical direction on an absolute or a proportional basis. To avoid accumulated round-off errors, the sizing of an object always relates to a dynamic initial position, which corresponds to the position in which the object currently would be if moved by a dynamic action, without regard for positional changes due to resizing of the window. However, the position of the object in a window is always saved based upon its initial position.

37 Claims, 6 Drawing Sheets

INITIAL STATE

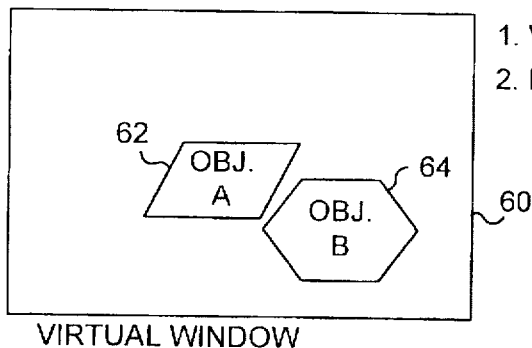

1. VIRTUAL WIND. = CURR. WIND.
2. INIT. POS.=DYNAM. POS.=CURR. POS.

*FIG. 3A*

RESIZE WINDOW

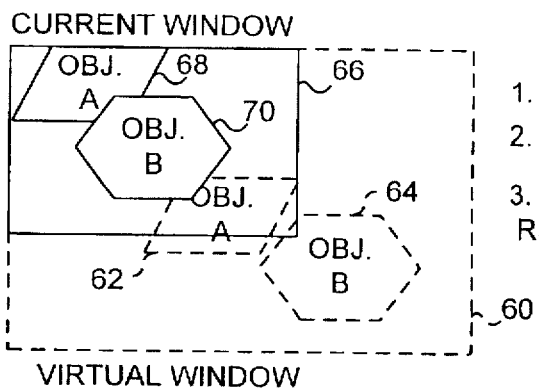

1. VIRTUAL WINDOW IS UNCHANGED
2. CURRENT WINDOW IS SMALLER
3. POSITION OF OBJECTS CHANGES RELATIVE TO WINDOW RESIZING

*FIG. 3B*

DYNAMIC MOTION OF OBJECT

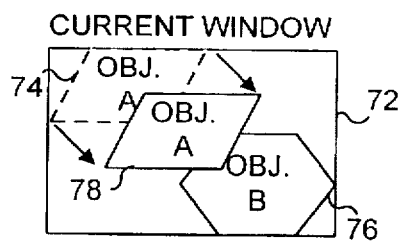

1. OBJ. A MOVES UNDER PROGRAM CONTROL TO OVERLAP OBJ. B

*FIG. 4A*

RESIZE WINDOW

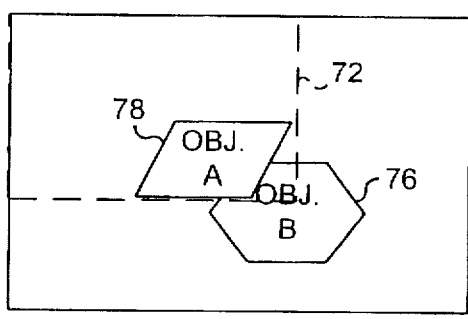

1. OVERLAP OF OBJ. A AND OBJ. B IS PROPORTIONALLY MAINTAINED - SUBJECT TO BEHAVIOR ASSIGNED TO OBJECTS

*FIG. 4B*

RESIZING A WINDOW AND AN OBJECT ON A DISPLAY SCREEN

FIELD OF THE INVENTION

This invention generally pertains to redrawing windows on a graphic user interface display screen, and more specifically, to handling the relative position and sizing of graphic objects that appear within the windows when the windows are redrawn after being resized.

BACKGROUND OF THE INVENTION

Graphic user interface (GUI) operating systems, such as Microsoft Corporation's WINDOWS™, have recently grown in popularity to become the "norm," substantially superseding text-based operating systems for use on personal computers. A basic element of almost any application running under a GUI operating system is a display in which objects are represented within one or more defined areas of the screen called windows. The objects that can be displayed in a window include images, text, controls, animations, and videos. Multiple windows can be opened on the display and maximized to cover the entire screen or readily resized by selecting a border or corner of the window with a mouse-controlled cursor and dragging it to a different position. Sizing buttons are also typically provided in a window on a GUI operating system to enable a user to quickly change the size of a window so that it occupies either the entire screen or a predefined, typically smaller, portion of the screen. However, the resizing of windows can create problems for applications that must control the manner in which objects within a resized window are redrawn to accommodate the change in the window size.

For example, when a window is enlarged in the horizontal direction, should the objects in the window increase in size proportionally only in the horizontal direction, to match the increase in the width of the window? Or, when an object moves within a window that is then resized, how should the position of the object be handled when the object is redrawn in the resized window? Should the resizing of a window both vertically and horizontally be reflected in a change in the size of all objects in the window proportional to the change in the width and height of the window? These questions illustrate significant issues in handling window resizing that are not well addressed by the specifications of any GUI operating system.

Typically, many GUI applications do not handle window resizing well. For example in most applications, resizing the window in which objects are displayed does not cause any change in the size of the objects. Instead, the objects simply remain static in both size and position within the window when it is redrawn on the display following a resizing operation. If the width of the window is decreased so that the margin of the window passes through an object, the portion of the object beyond the margin is cut off by the margin and simply not displayed. Some image view programs permit resizing of an object window in which an image appears, but do not respond to changes in the size of the application background window in which the object windows are displayed.

When the window containing a document is resized in most word processing programs, e.g., reduced in size horizontally, the text in the window is simply cut off at the margin of the new window, if it extends past the new edge of the window. Usually, there is some provision for resizing the font displayed so that a smaller window will again display the full extent of the text between the margins on a page in the window. However, this process is typically not handled automatically by the application in response to resizing of the window. Instead, the user must manually "zoom out" until the entire page width is displayed. Clearly, it would be preferable to automatically change the screen fonts so as to display the same text across the page of a document as a window displaying the document is resized.

Handling window resizing in multimedia works is even more difficult, because objects in a window may be moving at the time the window is resized. The movement of the objects can be due to the nature of the objects, or may be due to actions by the user, such as selection of control options in the multimedia work. For example, the relative position of objects moving in an animation can be difficult to control properly as a user resizes the window holding the objects. In many multimedia works, the problems involved with resizing windows have been considered so difficult to handle by some authoring schemes that resizing of the window in which the multimedia work is playing is precluded. Thus, a work published to run on a screen that is 640×480 pixels will be displayed in a fixed 640×480 pixel window occupying only a portion of a screen operating at a higher resolution.

The problems that arise when resizing of a window in which a multimedia work is playing is allowed are readily apparent. For example, if all objects in the multimedia window are resized in proportion to a change in the window size, an image may become distorted if its width is increased in proportion to an increase in the window width, but the height of the image is not increased.

Certain objects must be maintained at relative positions in a window, regardless of sizing changes. For example, a title bar that is centered within a window should remain so when the window is resized. It may be important for some objects to be positioned at an absolute position in a window, regardless of any resizing of the window. Further, for specific circumstances, it is possible that some objects should be resized in proportion to a resizing of the window and some should not. For example, a cursor bar along the side or bottom of a window should have a constant width as the size of a window in which the cursor bar appears is changed, yet the length of the cursor bar should be proportional to the dimension of the window, as the window is resized.

One of the problems associated with handling objects that are moved in connection with window resizing results from accumulated round-off error. Object size and position are represented by integer values of pixels. If two objects are moving, e.g., in an animation, each successive resizing of the window in which the objects appear so as to resize and reposition the objects in proportion to the change of the window size will contribute to a round-off error in the relative position of the object. Eventually, as the process of resizing the objects and the window continues, the objects will no longer appear in proper relative position to each other or to other objects in the window that are not moving due to the round-off error. In some situations, only two or three resizing operations can cause a discernible and objectionable error in the position of a moving object relative to other objects. Clearly, simply changing the size and position of a moving object from its current state to a new state in a redrawn window in proportion to changes in the dimensions of the window does not provide an acceptable solution to this problem.

SUMMARY OF THE INVENTION

In accordance with the present invention, a method is defined for handling an object included in a window that is resized on a display. The method includes the steps of enabling an author to selectively set a plurality of parameters that determine a position and a size of the object in the window when it is resized. The plurality of parameters are bound to the object when it is saved for subsequent display on the display. When displayed within an initial window on the display, the object is in a first position and has a first size. The plurality of parameters are applied to determine how the object is resized and repositioned in response to a user resizing the window in which the object appears.

Preferably, the plurality of parameters include a sizing constraint, a centering characteristic, and/or a movement characteristic. The author is enabled to selectively set an absolute horizontal constraint, a proportional horizontal constraint, an absolute vertical constraint, and/or a proportional vertical constraint that will apply to the object when the window is resized. Similarly, the author is enabled to selectively set a vertical absolute movement, a vertical proportional movement, or select no vertical movement, and can selectively set a horizontal absolute movement, a horizontal proportional movement, or select no horizontal movement to apply to the object when the window is resized. Further, the author can selectively set at least one of a horizontal absolute resizing, a horizontal proportional resizing, no horizontal resizing, a vertical absolute resizing, a vertical proportional resizing, and no vertical resizing to apply when the window is resized.

Another option enables the author to selectively set one of a proportional centering characteristic and an absolute centering characteristic to apply to the object when the window is resized, for at least one of a left margin, a right margin, a top margin, and a bottom margin. The author is also preferably enabled to selectively inhibit at least one of a horizontal and a vertical centering of the object when the window is resized.

Another aspect of the present invention is directed to a method for handling an object included in a window that is resized on a computer display, where the object is subject to movement within the window due to a dynamic motion of the object. The method includes the step of determining and temporarily storing an initial position of the object in the window when the object first appears on the display. An initial dynamic object position corresponding to a position in which the object currently is as a result of any dynamic motion of the object, but excluding any effect of prior resizing of the window is also determined and temporarily saved. In addition, a current object position corresponding to a position in which the object is, subject to any dynamic motion and any previous resizing of the window, is determined, as are predefined sizing attributes of the object. The object is sized and positioned in accord with the predefined sizing attributes of the object, in relation to the initial dynamic motion of the object, in response to any resizing of the window.

The method preferably also includes the step of saving the initial position of the object in the window when saving a current state of an application in which the window and object are used. Each time that the window is resized or the object is dynamically moved, the current object position is redetermined. The dynamic movement of the object is caused either by the application in which the object and window are employed, or in response to an input by the user.

In the preferred form of the invention, the sizing attributes include at least one of a horizontal constraint, a vertical constraint, a horizontal resizing of the object, a vertical resizing of the object, a horizontal movement of the object, a vertical movement of the object, and a centering of the object. Furthermore, the sizing attributes are selectively set by the user to be either absolute or proportional to the resizing of the window.

The initial position of the object is determined in regard to a virtual window that is equivalent to a conformation of the window when it was last saved. The initial position is then equal to a dynamic position and to the current position of the object. Dynamic movement of the object after the window is resized causes an initial window that was first opened on the display to be reset and made equivalent to the current window, prior to the dynamic movement of the object.

Other aspects of the present invention are directed to a system for implementing the functions described above by executing machine instructions on a central processing unit (CPU), and to an article of manufacture that includes a memory medium on which are stored machine instructions. When the machine instructions are executed on a computer, they execute functions that are substantially similar to the steps in the above described methods.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3A is a schematic illustration showing a virtual rectangle that represents an initial state of a window in which two objects are initially displayed on a computer monitor;

FIG. 3B illustrates the two objects of FIG. 3A after the window is resized;

FIG. 4A illustrates a window in which an object has moved relative to another object in the display;

FIG. 4B illustrates the window of FIG. 4A after it is resized;

DESCRIPTION OF THE PREFERRED EMBODIMENT

Figure 1:
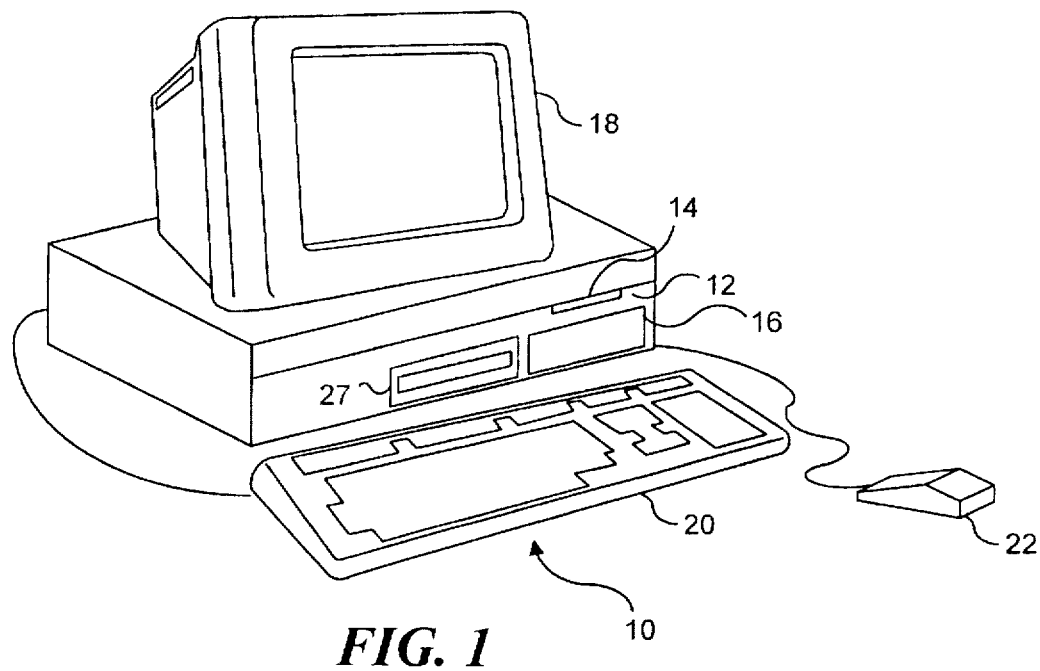
FIG. 1 is an isometric view of a personal computer system that is suitable for executing machine instructions in accord with the present invention.

The present invention is intended to be implemented on a personal computer 10, such as that shown in FIG. 1. Personal computer 10 is generally conventional in design, including a processor chassis 12 in which is disposed a 3½-inch floppy disk drive 14 and a hard drive 16. Both floppy disk drive 14 and hard drive 16 are used for storing executable files and data files, the floppy disk drive reading/ writing files on floppy disks (not shown), e.g., to convey the files between personal computer 10 and another computer (not shown). In addition, personal computer 10 includes a monitor 18, which is preferably capable of graphic resolutions of at least 640×480 pixels, at 256 colors. A keyboard 20 and a mouse 22 (or other pointing device) are coupled to the personal computer to enable the user to control applications executing on the computer and to provide alphanumeric and graphically selected input to such programs. Personal computer 10 is a multimedia-type personal computer, because it includes an internal sound card (not shown in FIG. 1) and a CD-ROM drive 27.

Figure 2:
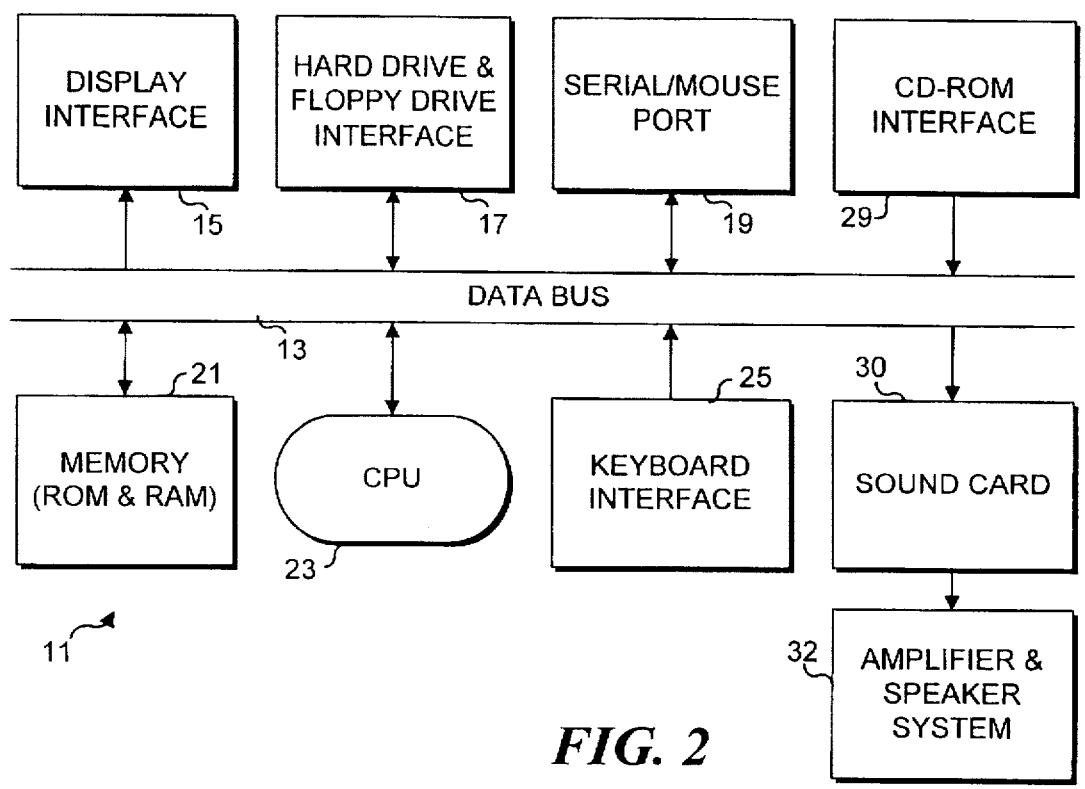
FIG. 2 is a schematic block diagram illustrating components of the personal computer system of FIG. 1.

Some of the internal components of processor chassis 12 are illustrated in FIG. 2, in a block diagram 11. Inside processor chassis 12 is disposed a CPU 23 that is coupled to a data bus 13. The data bus provides bi-directional communication of data and control instructions between CPU 23 and other components. Coupled to data bus 13 are a display interface 15 for driving monitor 18, a hard drive and floppy drive interface 17 for controlling hard drive 16 and floppy disk drive 14, a serial/mouse port 19, a CD-ROM interface 29 for controlling the CD-ROM drive, a memory 21 that includes both read only memory (ROM) and random access memory (RAM), a keyboard interface 25, and a sound card 30. An amplifier and speaker system 32 is (externally) coupled to sound card 30, enabling the user to play MIDI files, wave files, and Red Book audio stored on a CD-ROM disk that is inserted into the CD-ROM drive. Further details of personal computer 10 and its internal components need not be further described, since multimedia-type personal computers suitable for use in connection with the present invention are well known to those of ordinary skill in the art and are readily available from many different sources.

The present invention is included in a full authoring (edit) of a multimedia work authoring program referred to by the trademark SYMMETRY™ that enables an author to create or produce a multimedia work initially stored on hard drive 16 and subsequently transferred to a master CD-ROM disk. The multimedia work is then reproduced on CD-ROMs for distribution to end users. To play the multimedia work, an end user executes a run-time version of the SYMMETRY program that is included on the CD-ROM. This run-time version is thus essential a multimedia work player program for the multimedia works produced by the edit version of the multimedia work authoring program.

The SYMMETRY program (both versions) is intended to run under a GUI, such as provided in Microsoft's WINDOWS™ operating system. It is contemplated that at least the run-time version of the program will also be implemented for use on other types of computers and under other types of graphic operating systems, such as Apple's SYSTEM 7™. The invention could also be implemented in a non-graphic user environment, for example, under MS-DOS or a UNIX operating system. Furthermore, the present invention can be incorporated in other types of applications besides multimedia authoring/run-time systems and can be easily be modified to run on almost any type of computer or workstation.

In the SYMMETRY multimedia authoring program, sizing behavior refers to the way in which an object appears and behaves as a window containing the object is resized. As is true of most graphic user environments, under the WINDOWS operating system, if resizing is enabled for a window, a user can click on the border of the window (that is not maximized) and drag it to resize the window, making it either wider or taller on the display screen. It is also possible to simultaneously resize both the width and height of a window that is not maximized by selecting a corner of the window with the mouse cursor and dragging the corner to enlarge or decrease the area of the window.

Resizing a window in which objects appear can affect the way in objects are displayed on the screen in the resized window, based upon parameters that have previously been selected. As will be described in further detail below, the SYMMETRY program provides several options for setting the sizing behavior of objects on a page of a multimedia work. These options determine how each object will appear if the user changes the size of the window. To access the properties, an author selects an option entitled "Object Initialization Properties" from the menu in the SYMMETRY program. In response, a dialog box (not shown) is displayed, enabling the author to select sizing properties for an object.

It will be apparent that different objects must be handled in different ways in response to resizing of the window in which the objects are disposed. For example, a title bar object should normally remain centered between the side of a window as the width of the window is changed. The relative dimensions of some objects must be constrained and their position in a window, in either or both of the vertical and horizontal directions, must remain fixed relative to a border of the window. For example, if the object is a vertical scroll bar that is disposed against the right border of the window, resizing the width of the window in which the scroll bar appears should not cause the scroll bar to move away from the border or to change width of the scroll bar. Only its length should change in proportion to the height of the window.

An example of the manner in which objects are handled when a window is resized is shown in connection with FIGS. 3A and 3B. In FIG. 3A, a virtual window 60 is illustrated as it appears when the window is initially opened on display 18, including two objects at non-overlapping positions 62 and 64. These two objects are respectively labeled object A and object B. In this initial state, virtual window 60 is equivalent to the current window and the initial non-overlapping positions of objects A and B are equal to their dynamic positions and to their current positions. The term "dynamic position" refers to the position of an object that may be moved either by the user or by an application running on the computer that controls the position of the object. Any object that is not static on the display screen may have a dynamic position subject to change.

In FIG. 3B, the window previously shown in FIG. 3A has been resized to a current window 66 that is relatively smaller than the initial or virtual window 60. For comparison, virtual window 60 is shown in FIG. 3B as a rectangle defined by dash lines around its perimeter. In current window 66, following the resizing of the initial window, object B overlaps object A, and the two objects are respectively disposed at positions 70 and 68. The previous position of objects A and B are shown by the dash line representation of these objects at non-overlapping positions 62 and 64 within virtual window 60 of FIG. 3B.

Following the resizing operation, the virtual window remains unchanged although the current window is smaller than its previous size. Furthermore, the position of the objects within the window has changed in relation to the resized window, although the size of the objects has not changed in proportion to the resizing of the window. Alternatively, it is possible to selectively provide for resizing of objects A and B in proportion to the resizing of current window 66. Author selectable options such as this are described below, in connection with the parameters that control how resizing of a window in which objects appear will affect the size and position of the objects within the resized window.

The affect of dynamic motion of an object in connection with resizing a window are illustrated in FIGS. 4A and 4B. In FIG. 4A, a current window 72 is illustrated that includes an object A and an object B. Initially, object A is located at a position 74, but is moved under the control of an application program running on the computer (or moved in response to an input by the user) to a position 78 in which object A overlaps object B. Object B is static at a position 76.

In FIG. 4B, the previous window is resized to a current window 80, which is relatively larger. In this specific example, object A continues to overlap object B, and the two objects are disposed at positions 78 and 76. In other instances, the two objects may not overlap to the same extent (or at all). In the present invention, the degree of overlap of the objects is determined by the behavior associated with each object by the user, as will be apparent from the description below. The relative size of current window 80 compared to current window 72 is indicated by dash lines, which show the size of current window 72 prior to resizing. Thus, it will be apparent that the dynamic movement of object A in FIG. 4A serves as a basis for determining the relative positions of object A, so that it overlaps object B in current window 80, which has been resized. As noted above, in the present invention, the term "dynamic initial position" refers to a position where an object currently is disposed as a result of a dynamic motion of the object, but without affecting the position of the object due to sizing of a window. In the present invention, any sizing of an object in a window that is resized always relates to the dynamic initial position of the object to avoid accumulating round-off errors as windows in which the object appears are repetitively resized and also, to ensure that objects resize as a user would logically expect.

After current window 80 in which objects appear has been resized, the present invention will not save the window with the objects positioned as shown in FIG. 4B. Instead, the objects will be saved in respect to their initial positions as shown in FIG. 4A, i.e., at positions 74 and 76, respectively. This rule insures that the objects will again be initially positioned as they first appeared within a window if the application controlling the window is rerun using the resized window that was saved.

Figure 8:
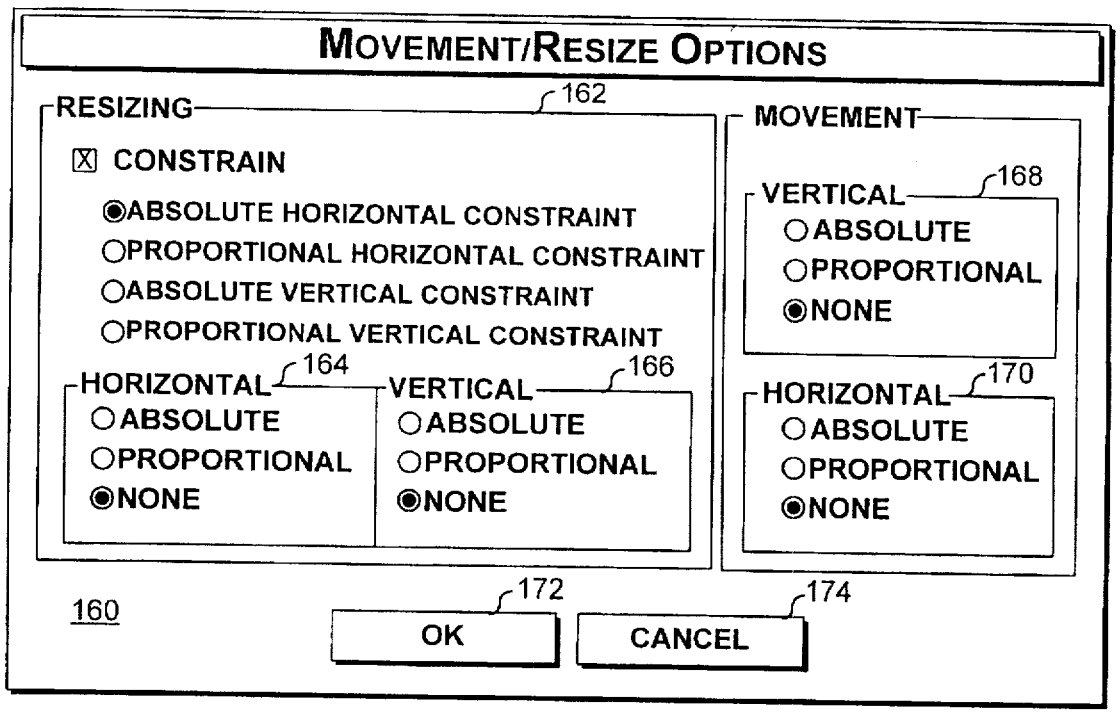
FIG. 8 is a dialog box in which an author specifies movement and resize options that control the manner in which an object is positioned and sized when a window containing the object is resized.

FIG. 8 illustrates a Movement/Resize Options dialog box 160 in which the user can selectively set the characteristics or parameters that will apply to each object in a multimedia work prepared using the SYMMETRY multimedia work authoring program. In this program, an author can restrict how an object is resized in response to horizontally and/or vertically resizing of the window in which the object appears. By selecting the Constrain checkbox within a section 162 of the dialog box and checking one of the radio buttons under this topic, the effect of resizing the window in only one of the horizontal or vertical directions can be applied to both the vertical and horizontal size of the object. For the example shown in FIG. 8, the Constrain checkbox has been selected and the radio button for absolute horizontal constraint has been selected. Under the Constrain checkbox, the author can alternatively select Proportional Horizontal Constraint, Absolute Vertical Constraint, or Proportional Vertical Constraint. If either of the horizontal constraint options are chosen, resizing the window vertically has no effect on the size of the object. Similarly, if either of the two vertical constraint options is chosen, resizing the window's width has no effect on the size of the object. In these and the other options that are available to the author, selection of one of the absolute options provides for resizing of the object to maintain the current horizontal or vertical distance between the object and the margin that is being moved to resize the window. Thus, when Absolute Horizontal Constraint is chosen, the object gets smaller (both horizontally and vertically) as the left margin is moved to reduce the width of the window, and the size of the object is controlled to maintain the distance between the left margin and the left side of the object constant. In contrast, selection of one of the proportional options provides for resizing of the object (both horizontally and vertically) in relation to the horizontal or vertical size of the window. If the window height is reduced to one-half of its prior value when Proportional Vertical Constraint is chosen for an object, the object's height and length are both proportionally reduced by a factor of two.

If the Constrain checkbox is not selected, the author alternatively has the option of selecting an Absolute, Proportional, or None radio button for each of the horizontal and vertical directions, respectively provided in sections 164 and 166 in dialog box 160, and resizing the window horizontally or vertically will separately affect only the respective horizontal or vertical size of the object as separately specified by the parameters selected in sections 164 and 166. If, as shown in the Figure, the radio button labeled None is selected for both horizontal and vertical directions, the object is not resized as the window in which it appears is resized. Selecting the Absolute radio button for the Horizontal section and the None radio button for the Vertical section will ensure that the object's width (but not its height) is resized to maintain a constant distance between the object and the margin being adjusted as the horizontal width of the window is changed. Changing the height of the window will not affect the object's size in either dimension.

If the None radio button is selected for Horizontal resizing in section 164 and if the Proportional radio button is selected for Vertical resizing in section 166, the object will be resized vertically, but not horizontally, in response to vertically resizing the window, and the vertical resizing of the object will be proportional to the vertical resizing of the object. Selection of the Absolute radio button under Vertical in section 166 in this example would result in the object being resized vertically, but not horizontally, so as to maintain a constant distance between the object and the upper or lower margin that is being moved to resize the window.

A section 168 labeled Movement in dialog box 160 enables the author to select one of three radio buttons for specifying a parameter for Vertical movement of the object as the window is resized vertically, and a corresponding section 170 enables the author to select one of three options for specifying the Horizontal movement of the object as the window is resized horizontally. The three radio buttons in each of these sections 168 and 170 provide for selection of Absolute, Proportional, or None. If the Absolute radio button for Vertical in section 168 is selected, vertically moving the lower margin of the window to decrease the size of the window will cause the object to move upward so as to maintain a constant distance between the lower margin and the object. If instead, the Proportional radio button is selected, the object will move upward in response to vertically moving the lower margin to reduce the size of the window, by an amount proportional to the change in window height, so as to maintain a relatively constant ratio of the distances between the object and the upper and lower margins. Setting either the Resizing or the Movement properties of an object to Absolute will override a Proportional setting for the other parameter. Once the author has set the movement/resize parameters, the selection can be entered by selecting a button 172 labeled OK or can be canceled by selecting a control button 174 labeled Cancel.

Figure 9:
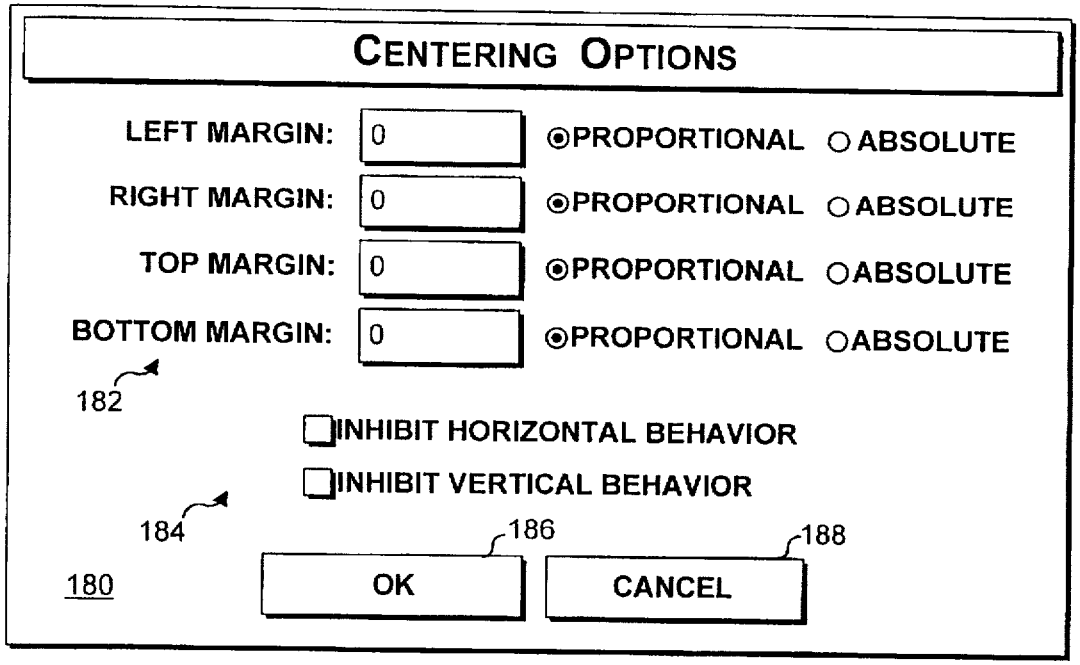
FIG. 9 is a dialog box in which the author selectively sets centering options for controlling the centering behavior of an object in a window that is resized.

A further parameter related to controlling the size and movement of objects within a window is available by selecting a Centering Options dialog box 180, as shown in FIG. 9. It should be noted that the centering options are an alternative to the movement/resize options shown in FIG. 8. Under the centering options of dialog box 180, a section 182 is provided to enable the author to specify the margins of a window as a percentage of the whole window size, either Proportional or Absolute. Proportional margins vary with the size of the window. By selecting either the Proportional or Absolute radio button for the four margins, the user can determine how an object will be positioned within a window. If the Absolute radio button is selected for a margin, the object is centered in relation to the size of the window less that margin size; however, absolute margins are measured in pixels and do not vary with the size of the window. By comparison, selecting the proportional radio button will insure that a margin varies with the size of the window.

A section 184 in the Centering Options dialog box includes two checkboxes that can alternatively be selected to determine if the object will be centered vertically only (by selecting Inhibit Horizontal Behavior), or horizontally only (by selecting Inhibit Vertical Behavior). The centering options are most often used for centering objects such as title bars within a window. When the window is refreshed or resized, the centering options selected by the author will apply to the object in the window.

Figure 5:
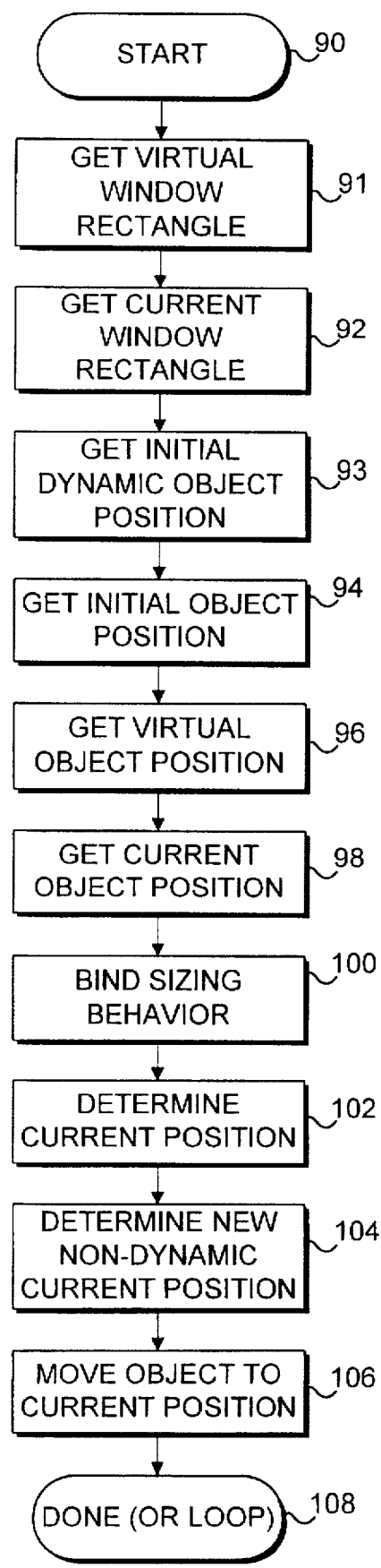
FIG. 5 is a flow chart showing the logical steps implemented in handling resizing of a window.

FIG. 5 shows the steps involved in handling resizing of a window to achieve control over the manner in which objects are moved and resized in response. The logic begins with a start block 90. Next, a block 91 notes that the virtual window rectangle is obtained, which is rectangle 60 in the example shown in FIGS. 3A and 3B. In a block 92, the current window is obtained, which in the example of FIG. 3B, corresponds to current window 66. A block 93 provides for obtaining the initial dynamic object position in the window. This position corresponds to the position of the object in the current window at the time a page is first displayed on the screen before any object in the window has moved. Next, a block 94 provides for getting the initial object position in the window, which is saved at the time the window is initially opened on the display screen to display the page. A block 96 obtains the virtual object position, which is either the same as the initial position if the object has not been dynamically moved, or is equal to object's position in a window that was resized and in which the object last dynamically moved. Finally, a block 98 provides for obtaining the current object position in the window that is displayed prior to implementing the present resizing operation.

In a block 100, the sizing behavior of an object in the window, which is determined by the sizing/movement or centering options applied to the object described above, is bound to the object to control its display within the window on the screen after the window is resized. A block 102 determines the current object position in the window based upon the changes in the size effected by the user dragging a corner or one side/margin of the window to change the dimensions of the window. Next, in a block 104, a new non-dynamic current object position is determined that is based upon the virtual window, the current window, and the initial window. For the non-dynamic current window, any change of position of an object in the window due to the dynamic movement of the object is disregarded in determining the position of the object. Finally, in a block 106, the object is redrawn in a position in the current window as determined in block 102. The position and size of the object in the current window as thus redrawn is of course based upon the sizing/movement behavior bound to the object in block 100. A block 108 indicates that the process is done. If further resizing of the window is occurring, the procedure loops back to block 91 to repeat the steps just described.

Figure 6:
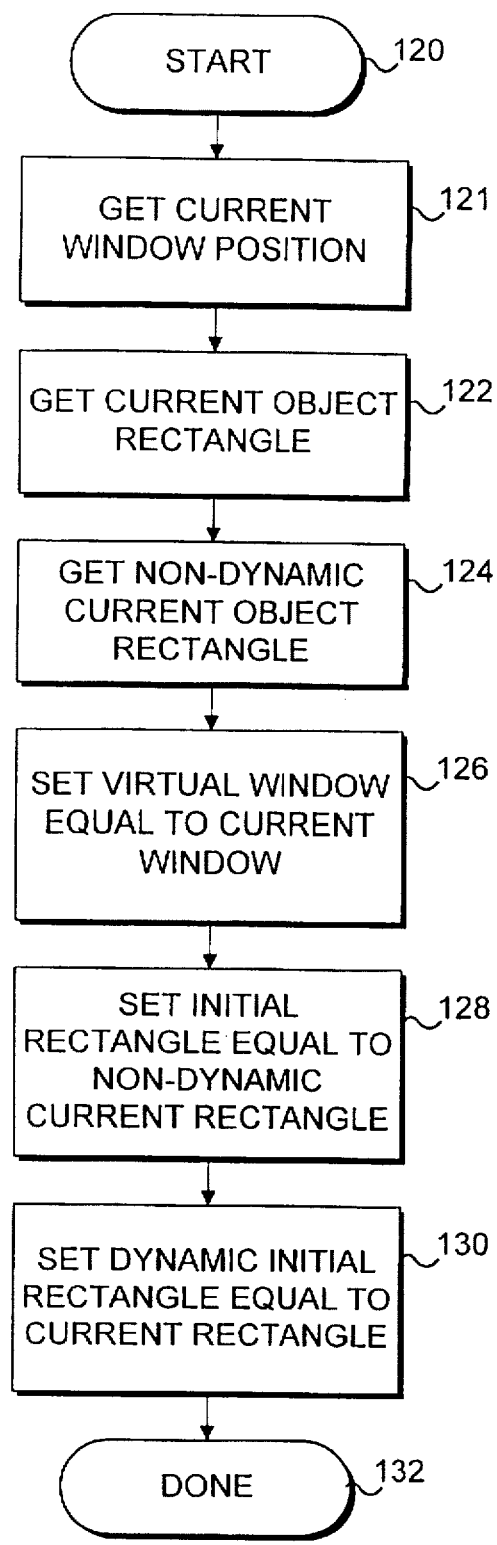
FIG. 6 is a flow chart listing the steps implemented in handling a window when an object in the window is affected by the user.

In the event that the user selects an object within a window by touching it with the cursor so as to initiate movement of the object, the process shown in FIG. 6 is initiated beginning at a start block 120. A block 121 obtains the current window position. In a block 122, the logic provides for getting the current object rectangle, i.e., position, within the window in which the object is displayed. A block 124 obtains the non-dynamic current object rectangle within the window, which corresponds to the position of the object in the current window absent any dynamic motion of the object, i.e., the motion of the object is ignored in determining its position. Next, a block 126 sets the virtual window equal to the current window, which causes the virtual window to change size if the window in which the object appears has been resized since the object was last dynamically moved. A block 128 sets the initial rectangle equal to the non-dynamic current rectangle for the object so that the position of the object independent of any dynamic motion of the object is preserved. Finally, a block 130 sets the dynamic initial rectangle equal to the current rectangle for the object, thereby resetting the position of the object in the current window as a result of dynamic motion, to the current state of the object. The process then terminates in a block 132.

Figure 7:
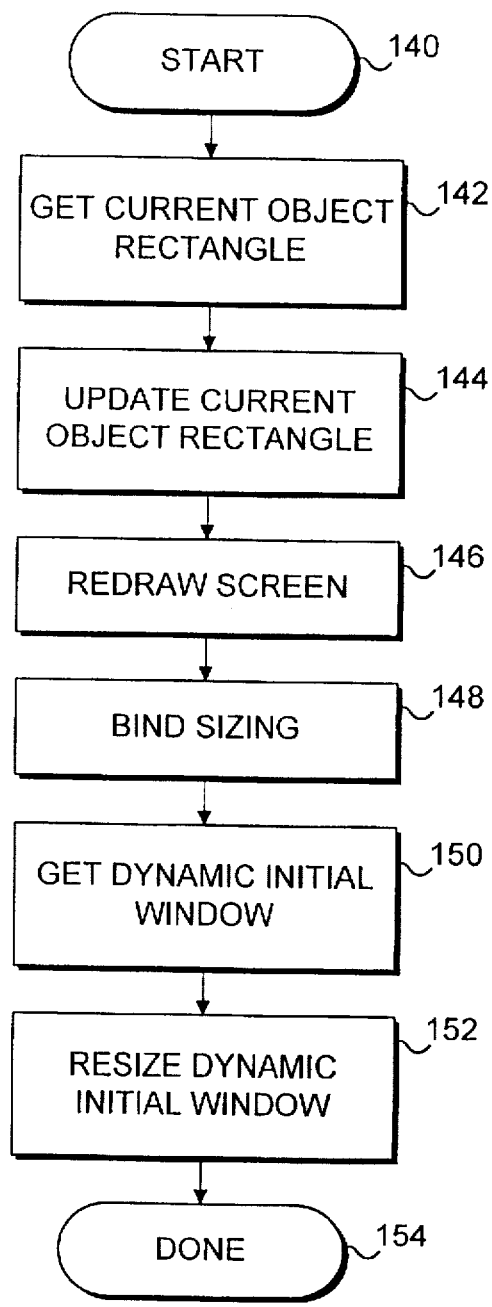
FIG. 7 is a flow chart that illustrates the logical steps implemented in resizing a window when an object within the window is dynamically moved.

FIG. 7 illustrates how the position of a dynamically moving object is handled in connection with the window in which it is displayed. Beginning at a start block 140, the process proceeds to a block 142 in which the current object rectangle is obtained. Next, in a block 144, the current object rectangle is updated by redrawing the screen to reflect the dynamic motion of the object so that the new position of the object in the current object window can be displayed, as provided in a block 146. A block 148 then binds the sizing characteristics of the object to enable its display in a resized window as determined by the author.

A block 150 obtains the dynamic initial window, which has been set as described above. Next, a block 152 resizes the dynamic initial window as a function of the current window and the virtual window. The process finishes in a block 154.

Although the procedure for handling objects in windows that are resized has been described in connection with its application to the SYMMETRY multimedia authoring program, it will be apparent that the same technique can be applied to other applications. For example, images within a word processing document can be handled in the same manner. Many other modifications can be made to the invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for handling an object included in a window that is resized on a display, comprising the steps of:

(a) enabling an author to selectively set a plurality of parameters that determine a position, and a size of the object when the window is resized;

(b) binding the plurality of parameters to the object when it is saved for subsequent display on the display;

(c) displaying the object in a first position and with a first size within an initial window on the display; and (d) applying the plurality of parameters to determine how the object is resized and repositioned in response to a user resizing the window in which the object appears.

2. The method of claim 1, wherein the plurality of parameters include at least one of a sizing constraint, a centering characteristic, and a movement characteristic.

3. The method of claim 1, wherein the author is enabled to selectively set at least one of an absolute horizontal constraint, a proportional horizontal constraint, an absolute vertical constraint, and a proportional vertical constraint, to apply to the object when the window is resized.

4. The method of claim 1, wherein the author is enabled to selectively set at least one of a vertical absolute movement, a vertical proportional movement, no vertical movement, a horizontal absolute movement, a horizontal proportional movement, and no horizontal movement, to apply to the object when the window is resized.

5. The method of claim 1, wherein the author is enabled to selectively set at least one of horizontal absolute resizing, a horizontal proportional resizing, no horizontal resizing, a vertical absolute resizing, a vertical proportional resizing, and no vertical resizing, to apply to the object when the window is resized.

6. The method of claim 1, wherein the author is enabled to selectively set one of a proportional centering characteristic and an absolute centering characteristic to apply to the object when the window is resized, for at least one of a left margin, a right margin, a top margin, and a bottom margin.

7. The method of claim 1, wherein the author is enabled to selectively inhibit at least one of a horizontal and a vertical centering of the object when the window is resized.

8. A method for handling an object included in a window that is resized on a computer display, where the object is subject to movement within the window due to a dynamic motion of the object separate from movement associated with the resizing of said windowed comprising the steps of:

(a) determining and temporarily storing an initial position of the object in the window when the object first appears on the display;

(b) determining and temporarily storing an initial dynamic object position corresponding to a position in which the object currently is as a result of any dynamic motion of the object, but excluding any effect of prior resizing of the window;

(c) determining a current object position corresponding to a position in which the object is, subject to any dynamic motion and any previous resizing of the window;

(d) determining predefined sizing attributes of the object; and (e) positioning and sizing the object in accord with the predefined sizing attributes of the object, in relation to the initial dynamic motion of the object and in response to any resizing of the window.

9. The method of claim 8, further comprising the step of saving the initial position of the object in the window when saving a current state of an application in which the window and object are used.

10. The method of claim 8, further comprising the step of redetermining the current object position each time that the window is resized or the object is dynamically moved.

11. The method of claim 8, wherein the dynamic movement of the object is caused either by an application in which the object and window are used or by a user.

12. The method of claim 8, wherein the sizing attributes include at least one of a horizontal constraint, a vertical constraint, a horizontal resizing of the object, a vertical resizing of the object, a horizontal movement of the object, a vertical movement of the object, and a centering of the object.

13. The method of claim 12, wherein the sizing attributes are selectively either absolute or proportional to the resizing of the window.

14. The method of claim 8, wherein the initial position is determined in regard to a virtual window that is equivalent to a conformation of the window when the window was last saved, and wherein the initial position is equal to a dynamic position, which is equal to the current position of the object.

15. The method of claim 14, wherein dynamic movement of the object after the window is resized causes an initial window that was first opened on the display to be reset to be equivalent to the current window, prior to the dynamic movement of the object.

16. A system that includes a display, for handling an object included in a window that is resized on the computer display, comprising:

a computer that includes a central processing unit for executing machine instructions and a memory for storing machine instructions that are to be executed by the central processing unit, said machine instructions, when executed by the central processing unit, implementing the following functions:

(a) enabling an author to selectively set a plurality of parameters that determine a position, and a size of the object when the window is resized;

(b) binding the plurality of parameters to the object when it is saved for subsequent display on the display;

(c) displaying the object in a first position and with a first size within an initial window on the display; and (d) applying the plurality of parameters to determine how the object is resized and repositioned in response to a user resizing the window in which the object appears.

17. The system of claim 16, wherein the sizing attributes include at least one of a horizontal constraint, a vertical constraint, a horizontal resizing of the object, a vertical resizing of the object, a horizontal movement of the object, a vertical movement of the object, and a centering of the object.

18. The system of claim 17, wherein the sizing attributes are selectively either absolute or proportional to the resizing of the window.

19. A system including a display, for handling an object included in a window that is resized in the display, wherein the object is subject to movement within the window due to a dynamic motion of the object separate from movement associated with the resizing of said window, comprising:

a computer having a central processing unit for executing machine instructions, and a memory for storing the machine instructions when they are executed by the central processing unit, said machine instructions, when executed by the central processing unit, implementing the following functions:

(a) determining and temporarily storing an initial position of the object in the window when the object first appears on the display;

(b) determining and temporarily storing an initial dynamic object position corresponding to a position in which the object is currently disposed as a result of any dynamic motion of the object, but excluding any effect of prior resizing of the window;

(c) determining a current object position corresponding to a position in which the object currently is disposed, subject to any dynamic motion and any previous resizing of the window;

(d) determining predefined sizing attributes of the object; and (e) positioning and sizing the object in accord with the predefined sizing attributes of the object, in relation to the initial dynamic motion of the object, in response to any resizing of the window.

20. The system of claim 19, wherein the machine instructions further implement the function of saving the initial position of the object in the window when saving a current state of an application in which the window and object are used.

21. The system of claim 19, wherein the machine instructions further implement the function of redetermining the current object position each time that the window is resized or the object is dynamically moved.

22. The system of claim 19, wherein the dynamic movement of the object is caused either by an application in which the object and window are used or by a user.

23. The system of claim 19, wherein the sizing attributes include at least one of a horizontal constraint, a vertical constraint, a horizontal resizing of the object, a vertical resizing of the object, a horizontal movement of the object, a vertical movement of the object, and a centering of the object.

24. The system of claim 23, wherein the sizing attributes are selectively either absolute or proportional to the resizing of the window.

25. The system of claim 19, wherein the initial position is determined in regard to a virtual window that is equivalent to a conformation of the window when the window was last saved, and wherein the initial position is equal to a dynamic position, which is equal to the current position of the object.

26. The system of claim 19, wherein dynamic movement of the object after the window is resized causes an initial window that was first opened on the display to be reset to be equivalent to the current window, prior to the dynamic movement of the object.

27. An article of manufacture, adapted for use with a computer for handling an object included in a window that is resized on a display, comprising:

a memory medium on which are stored machine instructions that are executable on a computer, said machine instructions, when thus executed, implementing the following functions:

(a) enabling an author to selectively set a plurality of parameters that determine a position, and a size of the object when the window is resized;

(b) binding the plurality of parameters to the object when it is saved for subsequent display on the display;

(c) displaying the object in a first position and with a first size within an initial window on the display; and (d) applying the plurality of parameters to determine how the object is resized and repositioned in response to a user resizing the window in which the object appears.

28. The article of manufacture of claim 27, wherein the sizing attributes include at least one of a horizontal constraint, a vertical constraint, a horizontal resizing of the object, a vertical resizing of the object, a horizontal movement of the object, a vertical movement of the object, and a centering of the object.

29. The article of manufacture of claim 28, wherein the sizing attributes are selectively either absolute or proportional to the resizing of the window.

30. An article of manufacture adapted for use with a computer that includes a display, for handling an object included in a window that is resized in the display, wherein the object is subject to movement within the window due to a dynamic motion of the object separate from movement associated with the resizing of said window, comprising:

a memory medium on which is stored machine instructions executable on a computer, said machine instructions, when executed on the computer, implementing the following functions:

(a) determining and temporarily storing an initial position of the object in the window when the object first appears on the display;

(b) determining and temporarily storing an initial dynamic object position corresponding to a position in which the object is currently disposed as a result of any dynamic motion of the object, but excluding any effect of prior resizing of the window;

(c) determining a current object position corresponding to a position in which the object currently is disposed, subject to any dynamic motion and any previous resizing of the window;

(d) determining predefined sizing attributes of the object; and (e) positioning and sizing the object in accord with the predefined sizing attributes of the object, in relation to the initial dynamic motion of the object, in response to any resizing of the window.

31. The article of manufacture of claim 30, wherein the machine instructions further implement the function of saving the initial position of the object in the window when saving a current state of an application in which the window and object are used.

32. The article of manufacture of claim 30, wherein the machine instructions further implement the function of redetermining the current object position each time that the window is resized or the object is dynamically moved.

33. The article of manufacture of claim 30, wherein the dynamic movement of the object is caused either by an application in which the object and window are used or by a user.

34. The article of manufacture of claim 30, wherein the sizing attributes include at least one of a horizontal constraint, a vertical constraint, a horizontal resizing of the object, a vertical resizing of the object, a horizontal movement of the object, a vertical movement of the object, and a centering of the object.

35. The article of manufacture of claim 34, wherein the sizing attributes are selectively either absolute or proportional to the resizing of the window.

36. The article of manufacture of claim 30, wherein the initial position is determined in regard to a virtual window that is equivalent to a conformation of the window when the window was last saved, and wherein the initial position is equal to a dynamic position, which is equal to the current position of the object.

37. The article of manufacture of claim 30, wherein dynamic movement of the object after the window is resized causes an initial window that was first opened on the display to be reset to be equivalent to the current window, prior to the dynamic movement of the object.

* * * * *